United States Patent [19]
Pitts

[11] 3,804,031
[45] Apr. 16, 1974

[54] AUTOMOBILE TRAY

[76] Inventor: Francis Watson Pitts, Box A, Lydia, S.C. 29079

[22] Filed: Oct. 11, 1972

[21] Appl. No.: 296,645

[52] U.S. Cl.................... 108/44, 211/72, 211/85, 297/135
[51] Int. Cl.. A47b 23/00, A47b 46/00, A47g 23/02
[58] Field of Search........ 108/44, 50; 297/232, 254, 297/113, 135, 194, 157, 235 A, 191; 229/30; D7/37, 38; D6/138; 224/42.45 B, 42.46 B, 42.42 A, 29 D; 5/94, 118; 211/73, 85, 74, 132, 86, 72; 220/23, 83, 86

[56] References Cited
UNITED STATES PATENTS

| | | | |
|---|---|---|---|
| 1,549,957 | 8/1925 | Belden................................. | 108/44 |
| 3,017,219 | 1/1962 | Mallett................................ | 297/135 |
| 2,832,657 | 4/1958 | Cariaga............................... | 297/135 |
| 3,494,662 | 2/1970 | Schaefer.......................... | 297/232 X |
| 1,680,539 | 8/1928 | Hadi................................... | 211/72 UX |
| 506,085 | 10/1893 | Whelan............................... | 297/160 |
| 1,625,515 | 4/1927 | Bailey................................. | 5/94 UX |
| 3,145,052 | 8/1964 | Morgan............................... | 297/354 |

FOREIGN PATENTS OR APPLICATIONS

| 1,151,940 | 5/1969 | Great Britain...................... | 108/44 |

Primary Examiner—Roy D. Frazier
Assistant Examiner—Abraham Frankel
Attorney, Agent, or Firm—Dennison, Dennison, Townsend & Meserole

[57] ABSTRACT

A refreshment holder tray for automobiles having a pair of front seat backs separated by a gap, and an arm rest in registry with the gap. The tray is constituted of a front section which seats on the arm rest, a rear section that extends between the backs of the front seats and the rear seat on which it rests, and a narrow neck section which extends through the gap between the front seat backs and connects the front and rear sections of the tray. Apertures for receiving and holding conventional containers of liquid, such as coffee, etc., are provided through the tray body in its front and rear sections, and platforms for seating the bottoms of containers are suspended from the tray beneath certain of the apertures. The means for suspending the platforms is detachable and also adjustable to maintain the platforms in selective horizontal positions when the tray is in service. In one form of the invention, the tray is constituted of subsections hingedly connected for folding in a compact package.

8 Claims, 7 Drawing Figures

AUTOMOBILE TRAY

BACKGROUND

The field of the present invention is the art of portable trays, particularly refreshment holder trays of the automobile seat supported type.

The prior art is replete with such trays, but the vast majority are mounted in or on brackets suspended from the tops of front seat backs. A typical example is illustrated in U.S. Pat. No. 2,584,006, which is a tray holder rather than a tray. So far as I am aware, nothing in the prior art teaches the use of a single tray which serves the occupants of both the front and rear seats of an automobile and which is supported solely by and between the rear seat and a conventional arm rest located between the driver and a passenger in the front seat.

SUMMARY OF THE INVENTION

When in service position, the tray of the present invention is a planar body resting freely at its front on the arm rest conventionally located between the front seat spaces of an automobile and resting freely at its rear end on the rear seat surface, with a narrow neck connecting the front and rear sections of the body and extending through a gap separating the front seat backs. The body of the tray is inclined rearwardly and downwardly at an angle determined by the relative heights above floor level of the upper surfaces of the arm rest and the rear seat. Accordingly, the tray does not require the installation of brackets or slings for its support; that is provided by the arm rest and the rear seat. One advantage of this arrangement is that the tray is always substantially at the lap level of the seat occupants, making it easy to reach articles on the tray and making the portion of the tray between the front seat backs and the rear seat available for use as a card table or game board holder. Containers of coffee and other liquid refreshment are held in the conventional manner in appropriate receiving apertures in the front and rear sections of the tray so that they cannot slide thereon. Provision is made for holding the bottoms of containers horizontally on platforms suspended from the tray body and selectively adjustable relative thereto, so that containers in the tray apertures may be maintained in vertical upright position regardless of the degree of inclination of the tray body. In one form of the invention the tray body is composed of subsections connected in foldable relation by hinge means so arranged that fortuitous fold collapse of the subsections from their coplanar service positions is prevented.

DETAILED DESCRIPTION OF PREFERRED EMBODIMENTS

Figure 1:
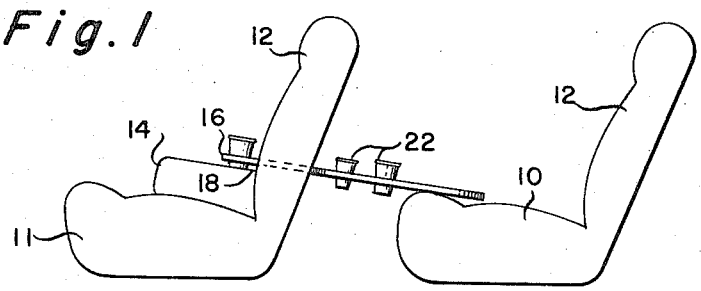
FIG. 1 is a side elevation of the seat compartment portion of an automobile with the tray of the present invention applied in service position.

The tray comprising the present invention is designed for use in automobiles in which the front seat arrangement is either of the bucket type or one in which the seat has two separate backs in laterally spaced relation. In either case, the space between the backs constitutes a gap that is partially occupied at the seat level by the rear end portion of an arm rest which serves both a driver and a passenger in the other portion of the front seat. The arm rest may be of the fixed type, or it may be a panel hinged to be swung up and back to fill the gap between the front seat backs to provide a continuous backing for the front seat assembly.

As herein disclosed, the invention is illustrated as applied in an automobile equipped with a conventional continuous rear seat 10 and laterally spaced bucket type front seats 11 which, together with their backs 12, are separated by a gap 13 that houses an arm rest 14.

Figure 2:
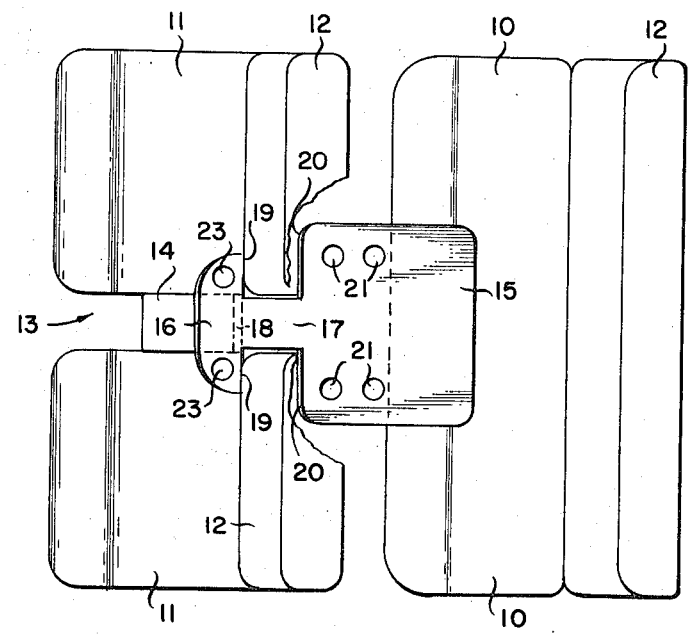
FIG. 2 is a top plan view of the FIG. 1 assembly, with part of the front seat backs removed for clarity of detail.
Figure 3:
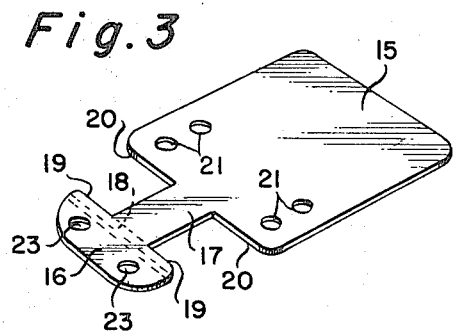
FIG. 3 is a perspective view of the tray shown in FIGS. 1 and 2.

The basic components of the tray comprising the present invention and the manner in which it is applied in service are as illustrated in FIGS. 1-3. These components are a rear section, a front section, and a neck connecting the sections in fore and aft spaced relation. In the embodiment illustrated in FIGS. 1-3 the tray is a one-piece planar body of light wood or plastic approximately one-quarter inch thick. The tray includes a substantially squared rear section 15, a T-shape front section 16, and a narrow neck 17 between and connecting the two sections. The neck actually is the shank of the T-shape front section 16. The geometrical shape of the tray body is such that when it is in service position the neck 17 is seated on the arm rest 14 in the gap 13 between the adjacent side edges of the front seat backs 12. The front section 16 is seated on arm rest 14 and extends laterally from each side thereof to project part way across and above the underlying seat at the level of the arm rest. The rear section 15 extends between the rear faces of the front seat backs and the front marginal area of the rear seat 10 on which it rests; so that the tray is supported at the front by the arm rest and at the back by the rear seat and in a somewhat rearwardly and downwardly inclined position. The degree of inclination depends upon the height of the arm rest relative to the height of the rear seat, which height is not the same in all types of cars. The T-head of the front section 16 is elevated above the arm rest by a batten 18 affixed to the under face of the section 16.

It will be seen from FIG. 2 that the lateral projections of the front section 16 are perpendicular to the side edges of the neck 17 and provide shoulders 19 which abut the front faces of seat backs 12 and hold the tray anchored against rearward sliding movement. Similar shoulders 20 are provided by the front edges of the rear section 15, and these shoulders abut the rear faces of the front seat backs, thus anchoring the tray against forward sliding movement. Tilting of the tray on its fore and aft axis is precluded by the width of its rear section 15, which width is greater than the width of the front section 16, thus providing a much larger lateral support area for the rear section of the tray than is obtainable for its front section.

Circular apertures 21 are provided through the rear section 15 to receive and hold conventional containers 22 for coffee or other liquids. The number and disposition of such apertures is optional, but it is preferred that they be located as shown in FIG. 3, in the side edge marginal zones of the section. A similar aperture 23 is provided in each lateral projection of the front section 16 at locations which are removed laterally from the sides of the arm rest 14.

Figure 6:
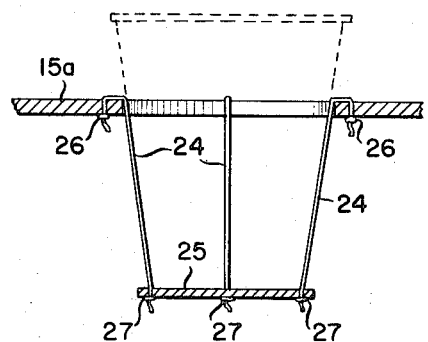
FIG. 6 is a sectional view on the line 6—6 of FIG. 4.
Figure 7:
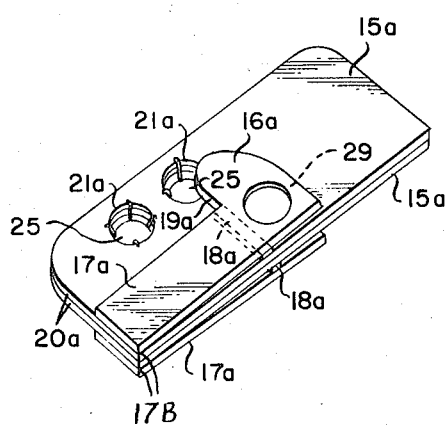
FIG. 7 is a perspective view of the tray of FIG. 4 as folded in a compact package for transportation.

FIGS. 4–7 illustrate an alternative embodiment of the invention. It has the same geometrical configuration and components as the tray of FIGS. 1–3, but is designed for folding into a compact package, as shown in FIG. 7, for convenience in storage. In this form, the tray is made up of subsections connected in hinged relation. The rear section is constituted of a pair of identical subsections 15a hingedly connected along the fore and aft axis of the tray by hinge means 15b, here shown as a flexible strip of fabric or plastic affixed to the upper faces of the subsections and spanning the line of division between them. The neck is formed of two identical subsections 17a which are hingedly connected to their adjacent subsections 15a on a transverse axis 17b normal to the fore and aft axis of the tray. The front section is constituted of identical subsections 16a that are integral with their respective neck subsections 17a. The hinges connecting the neck subsections with the rear subsections 15a are structurally the same as the hinge strip 15b, but are affixed to the under faces of their respective elements.

Figure 4:
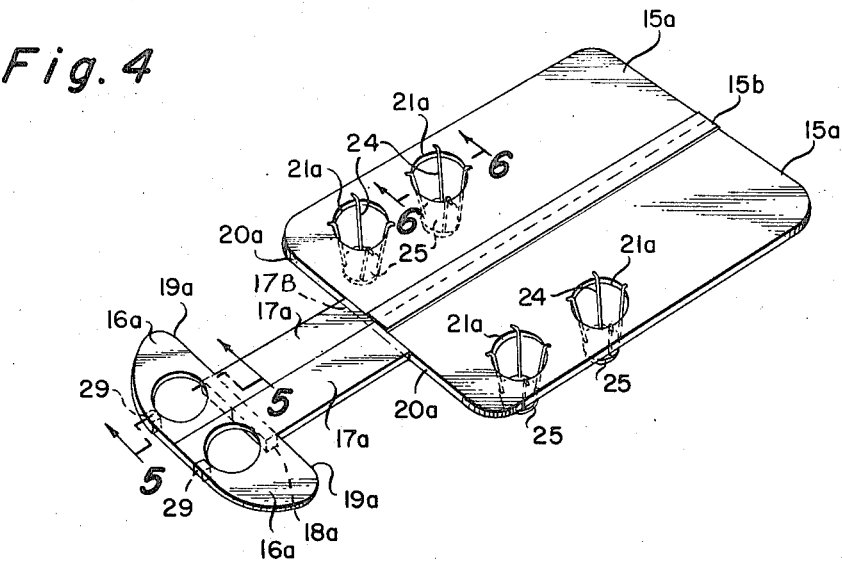
FIG. 4 is a perspective view of an alternative embodiment of the tray.
Figure 5:
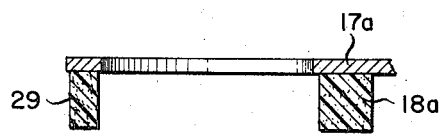
FIG. 5 is a sectional view on line 5—5 of FIG. 4, including an optional support 29 that is present in FIG. 4.

A salient feature of the invention is the provision of means for supporting containers, such as 22 of FIG. 1, suspended from the tray body and freely movable relative thereto rather than by compressive frictional engagement between the container wall and the sides of an aperture in which the container is seated. This means is illustrated in FIGS. 4 and 6, but is equally applicable to the one-piece tray illustrated in FIGS. 1–3. It comprises a plurality of flexible suspension members 24, here shown as lengths of string, secured at their upper ends to the body of the tray in a circular series around the perimeter of each container-receiving aperture 21a and attached at their lower ends to a platform disc 25 that provides a swingable seat for the bottom of a container seated thereon.

A convenient arrangement for effecting suspension of the discs 25 is illustrated in FIG. 6. As shown, the strings are trained through appropriate bore holes in both the disc and tray body with the upper end portions of the strings lying over and against the wall of the aperture 21a and the adjacent top face of the tray body. The upper end terminal portions of the strings are formed with enlarged knots 26 which engage the bottom face of the tray and prevent the strings from being pulled through their bore holes. In like manner, the lower end portions of the strings are passed through appropriate bore holes located slightly inwardly from the periphery of the disc, and their terminal portions are formed with enlarged knots 27 which engage the bottom face of the disc and secure it in place.

The discs 25 are vertically slidable on the strings so that, if desired, the plane of the discs may be selectively adjusted to maintain the discs in horizontal position regardless of the angle of inclination of the tray body. The portions of the strings which overlie the walls of the aperture 21a constitute cushions which absorb shock and prevent chafing of the container sides against the apertures in which they may be seated.

In the form of tray illustrated in FIGS. 4–7 it will be seen that the entire front section is elevated above the top of the arm rest by means of a batten strip 18a, preferably of "styrofoam" or other resilient material, affixed to each bottom face of the front subsections substantially at the junction of the subsections 16a with the neck sections 17a. Optionally, the batten 18may be supplemented by a block 29 also affixed to the bottom face of each subsection 16a.

MODE OF OPERATION

A preferred manner of installing the one-piece tray shown in FIGS. 1–3 is to rotate the tray substantially 90° from the plane of FIG. 3 and insert the front section 16 from the rear into the gap between the front seat backs and move the tray forwardly until the T-head of the front section clears the forward faces of the front seat backs 12. This will avoid the inconvenience of trying to force the head and neck vertically downward from the tops of the seats where the bulge of the seat backs 12 is greater than the space shoulders 19 of the front section and the shoulders 20 of the rear section. The body of the tray is then rotated back to its original plane and the front section is seated flatly on the arm rest 14 with the neck 17 elevated slightly above the arm rest and with the rear section resting on the surface of the rear seat 10.

A preferred manner of installing the foldable form of tray illustrated in FIGS. 4–7 is to fold the subsections 15a upwardly and inwardly against each other (reference being to their FIG. 4 positions). This will bring the neck subsections 17a and the front subsections 16a to bear against each other in parallel face to face contact. In their folded positions the companion subsections lie in parallel planes that are normal to the plane of the tray body when it is in service position. The folded assembly is then inserted in the gap between the front seat backs and moved forwardly until the shoulders 19a of the front subsections clear the bottom portions of the front faces of the seat backs 12, after which the various subsections are swung into their service positions, as shown in FIG. 4.

An important feature of the invention is the novel arrangement of the hinges in which the hinge 15b on the upper faces of the subsections 15a is on an axis perpendicular to the axes of the hinges which connect the neck subsections 17a to the rear subsections 15a and which are on the under faces of their respective subsections. When the tray is in service position, as shown in FIG. 4, fortuitous downward pressure that normally would tend to collapse the hinge 15b is resisted by the holding effect of the frictional face contact between the abutting faces of the edges of the neck subsections and their adjacent rear subsections along their respective hinge lines 17b. Due to the fact that their hinges are on the under face of the tray assembly, the one-quarter inch thick edges are forced tightly together under a pressure that increases in proportion to the downward pressure on the hinge 15b between the rear subsections 15a. The resistance thus provided is sufficient to prevent fortuitous folding movement of the rear subsections of the tray while it is in service position.

I claim:

1. An automobile tray comprising: a body having a rear section, a front section, and a neck section connecting the front and rear sections; the body further including at least one aperture for receiving and holding conventional containers for liquid, and being so constructed and arranged that when in service position in an automobile having a rear seat and a pair of front seats separated by an arm rest therebetween, the neck section will extend between the front seats and be supported on and by the arm rest, the front section will extend laterally part way over the front seats and be supported on and by the arm rest and the rear section will rest on and be supported by a portion of the automobile rear seat, and a platform beneath at least one of said apertures providing a seat for the bottom of the container in the aperture and flexible suspension means connecting the platform and the body of the tray.

2. In the tray of claim 1, said suspension means being selectively changeable to various positions of adjustment to maintain the platforms in horizontal plane positions without regard to possible service inclination of the tray body.

3. In the tray of claim 1, all said sections being integral and on a plane common to all providing a one-piece body.

4. In the tray of claim 1, the rear section being constituted of a pair of separate identical subsections connected by hinge means on the fore and aft axis of the body.

5. In the tray of claim 1, the neck and front sections being connected to the rear section by hinge means on an axis normal to the fore and aft axis of the body.

6. In the tray of claim 1, the rear section being constituted of a pair of separate identical subsections connected by hinge means on the fore and aft axis of the tray, the neck and front sections being separated along the fore and aft axis of the body into identical subsections and the neck subsections being connected to the rear subsections by hinge means on axes normal to the fore and aft axis of the body.

7. In the tray of claim 6, the hinge means connecting the rear subsections and hinge means connecting the neck subsections to the rear subsections being on opposite faces of the tray body.

8. In the tray of claim 7, the hinge means connecting the rear subsections being on the upper face of the tray body, and the hinge means connecting the neck subsections to the rear subsections being on the under face of the tray body.

* * * * *